June 19, 1951  A. E. SKELLEY  2,557,895
BASKET HANDLE
Filed Sept. 24, 1947

INVENTOR.
Arthur E. Skelley
BY Robb & Robb
Attorneys.

Patented June 19, 1951

2,557,895

UNITED STATES PATENT OFFICE 2,557,895

BASKET HANDLE

Arthur E. Skelley, Monticello, Iowa, assignor to Franklin Equipment Company, Monticello, Iowa, a corporation Application September 24, 1947, Serial No. 775,838

2 Claims. (Cl. 16—126)

My present invention comprises a novel handle construction and means for hingedly connecting the same to an object to be carried thereby.

The novel handle of my invention is adapted particularly for use in conjunction with metal baskets or containers.

The principal object of the invention is to provide a handle for this purpose which can be manufactured very cheaply and which has a very strong and rigid construction.

Another object of the invention is to provide a handle for this purpose which may be fabricated as a stamping from flat sheet metal.

Another object of the invention is to provide a handle for the purpose mentioned which though formed as a stamping from a flat sheet metal blank provides a large substantially cylindrical gripping portion that will readily fit the hand of a person without cutting the person's hand in the process of carrying the object associated with the handle.

Another object of the invention is to provide means for readily attaching the handle to the container or object to be carried thereby in hinged relation thereto, including means for maintaining the handle against shifting movement along the axis of its hinged connection.

Other objects, advantages and features of the invention will appear in the following description taken in conjunction with the accompanying drawing in which—

Figures 1, 3:
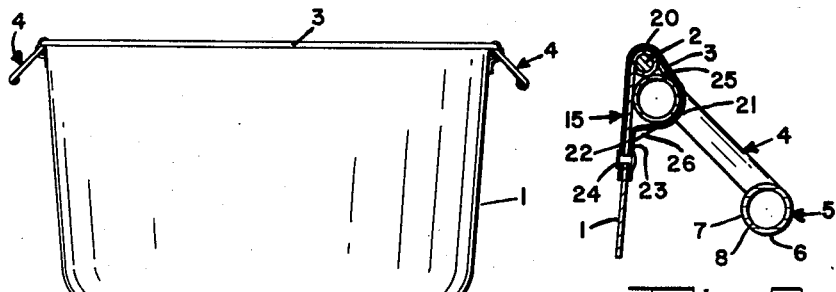
Figure 1 is a side view of a metal basket or container illustrating the handle means of my invention associated therewith.
Figure 3 is a sectional view taken substantially on the line 3—3 of Figure 2.
Figure 2:
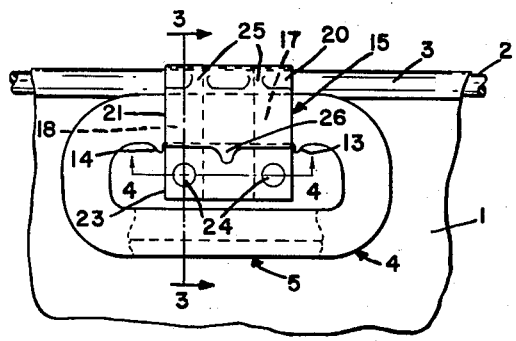
Figure 2 is an enlarged detail view of the handle and the portion of the basket with which it is associated looking toward the upper or outer side of the handle, the metal basket or container being shown broken away.
Figure 4:
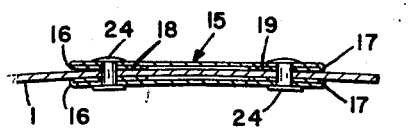
Figure 4 is a sectional view taken substantially on the line 4—4 of Figure 2.
Figure 5:
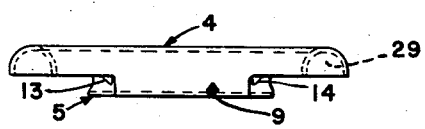
Figure 5 is an edge elevation of the handle alone looking in the direction of the arrow in Figure 6.
Figure 7:
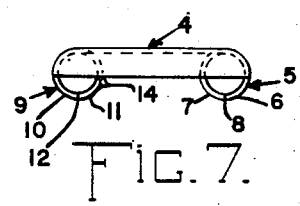
Figure 7 is an edge elevational view of the handle alone looking toward the right of Figure 2.
Figure 6:
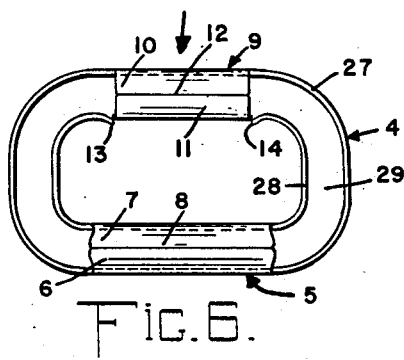
Figure 6 is a side elevation of the handle alone looking toward the inner or underside of the handle, being the side of the handle which lies adjacent to the metal basket or container with which it is associated when the handle is swung downwardly toward the basket or container around its hinge axis.

Now describing the invention in detail, Figure 1 illustrates a metal basket 1 of the open top type such as may be used for carrying ashes or like purposes. At the upper edge the basket 1 is reinforced by means of a metal hoop 2 which is secured to the basket 1 by rolling the upper edge of the basket proper outwardly and around the loop 2 as indicated at 3 as seen best in Figures 2 and 3 of the drawing. The basket 1 is shown in Figure 1 as being provided with two handle members generally designated by the numeral 4.

The details of the handle itself are seen best in Figures 2, 5, 6 and 7 and as there shown the handle 4 is of somewhat elliptical form and of substantially half round channel shape in cross section.

At one side of the handle 4, the same is formed with a hand gripping portion generally designated by the numeral 5. This hand gripping portion 5 is formed by means of ears or extensions 6 and 7 stamped out of the metal blank and formed by means of the stamping operation to semi-cylindrical shape with their free edges abutting one another as at 8, as seen best in Figures 3, 6 and 7. The formation of the hand gripping portion 5 of the handle is such as to provide a broad gripping or bearing surface for the hand of the user so that the weight of the loaded basket 1 will not cut the hand of the user when gripping the portion 5 of the handle 4 in lifting the basket 1.

At the opposite side of the handle 4, a bearing portion generally indicated by the numeral 9 is similarly formed, i. e., by means of ears or extensions 10 and 11 stamped out of the metal blank and formed to semi-cylindrical condition with their free edges in abutment as indicated at 12. This bearing portion 9 forms a hinge axis for the hinged connection of the handle 4 to the basket 1. In the stamping operation, lugs 13 and 14 are formed out of the metal blank and struck inwardly immediately adjacent to respective ends of the bearing portion 9.

The means for hingedly connecting the handle 4 to the basket 1 comprises a metal strap generally indicated by the numeral 15 which is reinforced at opposite side edges by bending as at 16 and 17 edge portions 18 and 19 reversely upon the main body of the strap 15. The strap 15 is formed with a substantially semi-cylindrical portion 20 fitting over the upper outturned rim 3 of the basket 1, which outturned rim 3 encloses the hoop 2. The semi-cylindrical portion 20 of the strap 15 is of a diameter to closely fit the upper rolled edge 3 of the basket 1. The strap 15 is also formed with a substantially semi-cylindrical portion 21 which is of a diameter to closely fit over and provide a bearing for the bearing portion 9 of the handle 4.

In assembling the handle 4 in its hinged relation to the basket 1, the bearing portion 9 of the handle is inserted between the innerside portion 22 and the outerside portion 23 of the strap 15 and disposed with the bearing portion 9 of the handle 4 within the bearing portion 21 of the strap 15 with the lugs 13 and 14 abutting the opposite outer edges of the bearing portion 21 of the strap 15, it being understood that the bearing portion 21 of the strap 15 has an axial length approximately the same as or slightly less than the axial length of the bearing portion 9 of the handle 4 so that the lugs 13 and 14 in abutting the outer edges of the bearing portion 21 of the strap 15 serve to retain the handle 4 in its hinged relation to the bearing portion 21 of the strap 15 and prevent any substantial axial movement of the handle 4 in the direction of its hinged axis when assembled upon the basket 1. When the bearing portion 9 of the handle 4 is disposed within the bearing portion 21 of the strap 15 as above described, the strap 15 is placed over the upper edge of the basket 1 with the semi-cylindrical portion 20 of the strap 15 fitting over the upper rolled edge 3 of the basket 1, the innerside portion 22 of the strap 15 extending downwardly along the inner wall of the basket 1 and the outerside portion 23 extending downwardly along the outer wall of the basket 1, as shown in Figure 3. The strap 15 with the assembled handle 4 is finally secured to the basket 1 by means of rivets 24 extending through the portions 22 and 23 of the strap 15 and through the wall of the basket 1.

It will be noted that the strap 15 is supplied with outwardly bulged portions 25 intermediate the semi-cylindrical portions 20 and 21 and is similarly formed with an outwardly bulged portion 26 intermediate the semi-cylindrical portion 21 and the outerside portion 23, for rigidity.

It will be apparent from the foregoing that the handle and means for hingedly mounting the same, according to my invention, are of a very strong and rigid construction which may be very cheaply fabricated essentially of two metal stampings one of which provides the handle per se and the other of which provides the hinged mounting means, and the handle including a hand gripping portion of substantially semi-cylindrical form providing a large bearing area minimizing the tendency of the handle to cut into the hand of the user when lifting the loaded container by means of the handle.

It will be noted that the ears or extensions 10 and 11 are in reality extensions of the channel edges 27 and 28, respectively, of the channel 29; and similarly, the ears or extensions 6 and 7 are in reality extensions of the channel edges 27 and 28, respectively. The lugs 13 and 14 project from the channel edge 28.

Having now particularly described and ascertained the nature of my said invention, and in what manner the same is to be performed, I declare that what I claim is:

1. As a new article of manufacture, a metal stamping comprising a substantially rectangular one-piece handle formed from a blank of flat sheet metal so as to comprise an endless semicircular channel shaped member, including a tubular hand gripping section at one side of said member formed from extended channel edges rolled into abutting relation, and including a tubular pivotbearing section at the opposite side of said member formed from extended channel edges rolled into abutting relation, said member also comprising spaced side arm sections interconnecting the aforesaid tubular sections, and one of the channel edges being formed with an offstanding lug at each end of the tubular pivotbearing section, said lugs being spaced from the side arm sections.

2. As a new article of manufacture, a metal stamping comprising a substantially rectangular one-piece handle formed from a blank of flat sheet metal so as to comprise an endless semicircular channel-shaped member, including a tubular hand gripping section at one side of said member formed from extended channel edges rolled into abutting relation, and including a tubular pivot bearing section at the opposite side of said member formed from extended channel edges rolled into abutting relation, said member also comprising spaced side arm sections interconnecting the aforesaid tubular sections, and one of the channel edges being formed with an offstanding lug at each end of the tubular pivot bearing section, said lugs being spaced from the side arm sections, and means for pivotally securing said handle to a basket to be carried thereby, said means comprising a metal strap formed from flat sheet metal and having its mid portion rolled to form a semi-cylindrical section adapted to fit over the rim of such basket, the portions of the strap extending from said section forming inner and outer legs to engage the inner and outer sides of such basket respectively, the outer leg formed with a semi-cylindrical bearing section for pivotally receiving the bearing section of said handle, said lugs being engageable with the outer ends of the bearing section of said outer leg when the handle is so received.

ARTHUR E. SKELLEY.

REFERENCES CITED

The following references are of record in the file of this patent:

UNITED STATES PATENTS

| Number | Name | Date |
|--------|------|------|
| 374,466 | Fitzsimmons | Dec. 6, 1887 |
| 890,102 | Skahen | June 9, 1908 |
| 1,090,122 | Adams | Mar. 10, 1914 |
| 1,243,278 | Frazier | Oct. 16, 1917 |
| 2,318,792 | Paddock | May 11, 1943 |